United States Patent
Williams

(10) Patent No.: US 9,065,300 B2
(45) Date of Patent: Jun. 23, 2015

(54) DUAL FUEL SYSTEM AND METHOD OF SUPPLYING POWER TO LOADS OF A DRILLING RIG

(76) Inventor: Kevin R. Williams, Cypress, TX (US)

( * ) Notice: Subject to any disclaimer, the term of this patent is extended or adjusted under 35 U.S.C. 154(b) by 589 days.

(21) Appl. No.: 13/467,565

(22) Filed: May 9, 2012

(65) Prior Publication Data

US 2012/0292992 A1    Nov. 22, 2012

Related U.S. Application Data

(63) Continuation-in-part of application No. 13/419,125, filed on Mar. 13, 2012, which is a continuation-in-part of application No. 12/757,234, filed on Apr. 9, 2010, now Pat. No. 8,446,037.

(60) Provisional application No. 61/266,734, filed on Dec. 4, 2009.

(51) Int. Cl.
| | |
|---|---|
| *H02J 1/00* | (2006.01) |
| *H02J 3/00* | (2006.01) |
| *H02J 9/00* | (2006.01) |
| *H02J 3/38* | (2006.01) |
| *H02J 3/28* | (2006.01) |
| *H02J 9/06* | (2006.01) |
| *F02D 19/10* | (2006.01) |
| *F02D 29/06* | (2006.01) |
| *F02D 19/06* | (2006.01) |

(52) U.S. Cl.
CPC .............. *H02J 3/381* (2013.01); *Y10T 307/675* (2015.04); *Y10T 307/344* (2015.04); *Y10T 307/685* (2015.04); *H02J 1/00* (2013.01); *H02J 3/00* (2013.01); *H02J 9/00* (2013.01); *H02J 3/28* (2013.01); *H02J 9/06* (2013.01); *F02D 19/0647* (2013.01); *F02D 19/10* (2013.01); *F02D 29/06* (2013.01); *Y02T 10/36* (2013.01)

(58) Field of Classification Search
CPC ................. H02J 1/00; H02J 3/00; H02J 9/00; H02J 3/28; H02J 3/381; H02J 9/06; F02D 19/0647; F02D 19/10; F02D 29/06; Y10T 307/344; Y10T 307/675; Y10T 307/685; Y02T 10/36
USPC .......................................... 307/23, 75, 77, 94
See application file for complete search history.

(56) References Cited

U.S. PATENT DOCUMENTS

| | | | |
|---|---|---|---|
| 4,590,416 A | 5/1986 | Porche et al. | |
| 5,370,097 A * | 12/1994 | Davis | ............................. 123/526 |
| 7,222,015 B2 * | 5/2007 | Davis et al. | .................... 701/103 |
| 7,633,248 B1 | 12/2009 | Williams | |
| 7,748,450 B2 * | 7/2010 | Mundell | ................... 166/250.15 |
| 2008/0203734 A1 | 8/2008 | Grimes et al. | |
| 2009/0195074 A1 | 8/2009 | Buiel | |
| 2009/0312885 A1 | 12/2009 | Buiel | |
| 2011/0074165 A1 | 3/2011 | Grimes et al. | |

* cited by examiner

Primary Examiner — Hal Kaplan
(74) Attorney, Agent, or Firm — Egbert Law Offices, PLLC

(57) ABSTRACT

A system for providing power to a load of a drilling rig has a dual fuel engine/generator and an energy storage system. The load is switchably connected to one or both of the dual fuel engine/generator and the energy storage system. The dual fuel engine/generator and the energy storage system have a capacity suitable for supplying requisite power to the load. A rectifier is connected to an output line of the engine/generator so as to convert the AC power to DC power. The energy storage system is a battery. The dual fuel engine/generator can be either a dedicated duel fuel system or a fumigation system.

15 Claims, 8 Drawing Sheets

DUAL FUEL SYSTEM AND METHOD OF SUPPLYING POWER TO LOADS OF A DRILLING RIG

CROSS-REFERENCE TO RELATED APPLICATIONS

The present application is a continuation-in-part of U.S. patent application Ser. No. 13/419,125, filed on Mar. 13, 2012, and entitled "System and Method of Supplying Power of Loads of a Drilling Rig". U.S. application Ser. No. 13/419, 125 is a continuation-in-part of U.S. patent application Ser. No. 12/757,234, filed on Apr. 9, 2010, and entitled "Energy Storage System for Peak-Shaving of Drilling Rig Power Usage". U.S. patent application Ser. No. 12/757,234 claimed priority from U.S. Provisional Patent Application No. 61/266, 734, filed on Dec. 4, 2009.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to energy systems as used on drilling rigs. More particularly, the present invention the relates to drilling rigs that are supplied with power from a dual fuel engine/generator. Additionally, the present invention relates systems for supplying power and for storing power through the use of batteries and other energy storage systems.

2. Description of Related Art Including Information Disclosed Under 37 CFR 1.97 and 37 CFR 1.98.

In the field of oil well drilling, a significant amount of power is required during the drilling activity. The power requirements, as used on a drilling rig, serve to supply the drawworks, the mud pumps, the top drives, the rotary tables, the dynamic braking systems and other peripheral loads. In oil well drilling activities, oversized power systems are often utilized so as to meet the "peak" power requirements.

Historically, the number of engines/generators that are used and are typically online are more than the required load of the application due to the redundancy and necessary peak KW and VAR demand during certain aspects of the operation. In particular, these peak demands are during the "tripping" of the pipe or drill stem.

During normal operations, there is a base load of lighting, pumps, agitators, mixers, air compressors, etc. This base load can make up typical loads of 400-600 kilowatts. The mud pumps, top drives and rotary tables contribute another fairly consistent KW demand. This demand will vary based on the particular well, depth of drilling, and material being drilled.

During oil well drilling activities, the most intermittent load is the drawworks. This intermittent load is directed toward the peak demand during the raising or lowering of the drill pipe upwardly and downwardly in the well. This peak demand can have loads as much as two to three times the base loads of the other demands on the drilling rig.

When drilling and at times when the downhole tool has to be inspected or changed, it is required to pull all of the drill pipe from the hole. This distance can be 10,000 feet or more. The drill pipe must be taken apart and stacked as it is being removed. After repair or replacement, the reverse procedure must take place so as to reinsert all the components back to the desired depth. During the tripping in or out of the hole, the driller (operator) demands extreme power consumption and very quick bursts as the driller raises (or lowers) the string of drill pipe. Since there is a limitation on the height of the drilling mast, the operator must lift the sections in increments and unscrew the different sections. These sections are stacked one at a time. This process is repeated during the reinsertion of the drill pipe back into the hole. This process is referred to as "making a trip". The intermittent high demand occurs when this load (300,000 pounds or more) occurs over and over again. The load is inconsistent since the weight of the drill stem becomes less and less as sections are removed. The base load requirements for the drilling rig are approximately 600 to 800 KW. The peak demand can be 1.5 MW and as high as 2.0 MW. Because of these power requirements, the emissions of the engines/generators for a typical land rig are quite high. Newer engines can have much lower NOx output than earlier engines. There are also large amounts of carbon dioxide emissions. The fuel consumption during these intermittent demands can be quite significant.

On mechanical rigs, power from the engines drives the rig equipment either directly, through a clutch, or through a torque converter. Electric rigs use engine power to drive one or more generators. The generated electricity is then used to operate motors for the larger equipment on the rig. There are three types of electric rigs, direct current, silicon-controlled rectifiers, and variable frequency drives. Direct current rigs have a DC generator that supplies power to DC motors. These are the oldest types of drive systems. The silicon-controlled rectifier systems produce AC power from the generators and then changed to DC by switchgear in order to power DC motors. This allows for more power to be generated by smaller generators. Variable frequency drives are the newest kind of rig which utilize variable speed AC motors so as to allow for even more power output for the same sized equipment.

There are various ignition methods that are used in the reciprocating internal compression engines used as the generator for electric drilling rigs. These ignition methods include compression ignition and spark ignition. Diesel engines are one type of compression ignition engine. Combustion air is first compression heated in the cylinder and diesel fuel oil is then injected into the hot air. Ignition is spontaneous because the air temperature is above the autoignition temperature of the fuel. Spark ignition initiates combustion by the spark of an electrical discharge. This engine is a dedicated natural gas engine and offers the greatest fuel cost savings and emission reductions in comparison to diesel engines.

Although all diesel-fueled engines are compression-ignited and all gas-fueled engines are spark-ignited, natural gas can be used in a compression ignition engine if a small amount of diesel fuel is injected into the compressed natural gas/air mixture so as to burn any mixture ratio of natural gas and diesel oil. This type of engine is often referred to as a "dual fuel" engine. Compression ignition engines usually operate at a higher compression ratio (ratio of cylinder volume when the piston is at the bottom of its stroke to the volume when it is at the top) than spark ignition engines because fuel is not present during compression. Hence there is no danger of premature autoignition. Since engine thermal efficiency rises with increasing pressure ratio (and pressure ratio varies directly with compression ratio), compression ignition engines are more efficient than spark ignition engines. This increased efficiency is gained at the expense of poorer response to load changes and the need for a heavier structure to withstand the higher pressures.

Natural gas generators are being used for land-based drilling applications and offer unique advantages in reduced exhaust emissions and significant fuel cost savings compared to more commonly-used diesel engine generators. Natural gas engine generators make it simpler to meet ever more stringent emissions regulations, particularly for oxides of nitrogen (NOx). Additionally, natural gas engine generators have the added advantage of accepting wellhead gas for further cost benefits. Diesel engines have much better load characteristics when compared to natural gas engines and therefore respond more reliably to changes in loads as drilling functions abruptly demand power requirements, such as tripping of the drill string.

The dual fuel engine is a compression ignition engine that operates on gaseous fuels while maintaining some liquid fuel injection to provide a deliberate source for ignition. Such a system is usually designed to minimize use of diesel fuel by replacing it with various gaseous fuels and their mixtures while maintaining satisfactory engine performance. Dual fuel engines offer reduced fuel costs and emissions benefits compared to conventional diesels. However, this benefit can be limited since the generator must occasionally switch from higher volume ratios of natural gas back to higher volume ratios of diesel fuel to meet the block loading and load-shedding conditions forced by changing rig power demands.

There are several approaches for dual fuel engine technologies. One approach is a dedicated dual fuel design which uses a direct metered cylinder charge of natural gas so as to permit natural gas levels approaching 99% with extremely low pilot fuel levels (near 1%). This is a purpose-built engine and consequently is very expensive. This engine is best suited for steadier, regulated loads. Typically, this type of engine is ill-suited for the dynamic loads of drilling rigs.

Another type of dual fuel engine/generator is the after market "fumigation system" adapted to almost any diesel engine brand. As such, each engine will have different displacements, diesel fuel injection systems, compression ratios, turbocharger boosts, intake manifold systems, cooling systems, and operate at different speeds. As such, the fuel ratio with a fumigation system will be inherently different on almost every engine. An important aspect of achieving optimum substitution with a fumigation system is reaching the "sweet spot" range of the particular engine by maintaining the ideal load.

There are problems associated with conversion of a conventional diesel engine to dual fuel operation. At light loads, dual fuel engines tend to exhibit inferior fuel utilization and power production efficiencies. There is higher unburned gaseous fuel and carbon monoxide emissions relative to corresponding diesel performance. Operation at light loads is also associated with greater cyclic variation in performance parameters, such as peak cylinder pressure, torque and ignition delay. This has narrowed the effective working range for dual fuel applications in the past. These trends arise mainly as a result of poor flame propagation characteristics within the very lean gaseous fuel/air mixtures and the origination of the various ignition centers of the pilot. The quality of natural gas used to fuel a converted engine, with respect to its percentage makeup of component gases, will directly affect power, efficiency, emissions, and longevity of the engine. In these fumigation-type dual fuel systems, there are several concerns relative to the natural gas/diesel ratio, the knock limit, and the maximum load rating. Gas composition, engine load factor, engine control strategy, engine condition, charge-air temperature and ambient conditions (temperature and altitude) govern the upper limit of gas substitution in most cases. Gas ratio is typically limited by the knock limit of the air-natural gas mixture at a particular engine load. In general terms, high quality gas and moderate engine loads (up to 70% of stand-by rating), will typically yield gas ratios between 30-70%. Lower quality natural gas, high engine loads, high charge-air temperatures and high altitude (or a combination of these factors) will typically limit gas ratio.

The gas substitution that is possible varies depending on gas quality, engine design, engine model and condition, engine load factor, charge air temperature (aftercooling), and ambient conditions (altitude and temperature), but should never exceed 70%, even under the most ideal conditions. In general, high quality gas (over 95% $CH_4$), combined with moderate engine power levels and low temperature aftercooling will typically yield gas ratios in the 60% to 70% range, although there are factors that can still limit this value to much lower levels. Lower quality gas, combined with high manifold air temperature and/or higher engine loads, will typically result in gas substitution closer to 50% or lower.

In most applications, engine knock (detonation) will be the limiting factor in determining maximum gas ratio. In most cases, short duration knock will not cause harm to the engine. However, extended operation in a knocking condition may result in engine damage or failure. A knocking condition can be diagnosed both audibly and by using the bi-fuel system vibration sensor data. Data from the engine vibration sensors should be monitored closely during the setup procedure to confirm proper engine operation. If knocking is detected during bi-fuel operation, the engine should be rapidly switched to 100% diesel operation. To prevent recurrence of knocking, a reduction in gas ratio and/or a reduction in engine load will be required.

Engines that are converted to dual fuel operation are typically utilized for peak shaving, prime power, co-generation, or other high use applications. It is important for the installing technician to understand the power rating system used for most high-speed diesel engines, and the associated duty-cycles applicable to each. Most manufacturers of high speed (1200-1800 rpm) diesel engines and generator sets publish stand-by, prime and continuous ratings. The stand-by rating is reserved for emergency operation only and represents the highest horsepower or work level that can be sustained for a limited period of time. In most applications, the stand-by rating will not be used for bi-fuel operation. The prime rating typically allows for unlimited hours of use, with a variable load, up to the prime rated output. The continuous rating is the most conservative rating, and is reserved for unlimited hours at a constant load. In general, bi-fuel mode is reserved for operations at or below the prime rating of the machine. The higher the number of hours of intended use and the more constant the load rate, the more conservative the rating should be.

Referring to FIG. 1, there is shown a prior energy system for use with the various loads of a drilling rig. In particular, the energy system 10 includes engines 12, 14 and 16. Engine 12 operates generator 18. Engine 14 operates generator 20. Engine 16 operates generator 22. The generators 18, 20 and 22 will pass AC power along respective lines 24, 26 and 28 to a common AC bus 30. Typically, the various engine/generators, as shown in FIG. 1, are diesel engines. However, it is possible that such engine/generator combination could be also natural gas engine/generators.

A common DC bus 32 is illustrated as connected to the various components 34, 36, 38, 40 and 42 of the drilling rig. Load 34 is a DB module. Load 36 is the drawworks. Load 38 is the top drive. Loads 40 and 42 are the mud pumps. Each of these loads 34, 36, 38, 40 and 42 are switchably connected to the common DC bus 32. The AC bus is configured to supply power to the hotel loads 44 and 46 of the drilling rig. Hotel loads 44 and 46 can include air-conditioning and heating, lighting, and other energy requirements of the drilling rig. A first rectifier 48 is connected between the AC bus 30 and the DC bus 32. Rectifier 38 serves to convert the AC power to DC power. Similarly, the other rectifier 50 is connected between the AC bus 30 and the DC bus 32, also to convert the AC power to DC power. The DC power is properly utilized by the loads 34, 36, 38, 40 and 42. In FIG. 1, it can be seen that there is a resistive load bank 52 that is connected, by a switch, to the AC bus. As such, any excess energy that is provided by the various engine/generator combinations can be burned as heat by the resistive load bank 52.

Currently-used natural gas engine/generators that are used to power a drilling rig must be controlled to accept a lower level of transient response than is possible with diesel power. This requires the estimating of the transient response capability of the natural gas engine/generator and the determining of how the rate of application or rate of load removal can be reduced to make the system work. Unfortunately, this results in reduced power rates and decreased rig productivity, even with the use of a ballast load or the resistive load bank 52. A typical approach is to create a load profile of the rig's expected operations in terms of power required versus time. The creation of this profile for both the desired "ideal" loading rates and for the drill site's minimum requirements will establish the minimum and maximum loading conditions for the rig powerhouse. Gas engine/generator operation is then controlled within these minimum and maximum values to attempt to minimize power interruptions from forced generator failure.

FIG. 2 shows the transient response of the natural gas engine/generator during the adding of load or the shedding of load. All gensets have a response to such added load or shredded load. Changes in voltage and frequency associated with this transient response is dependent on the generator type (e.g., diesel compression versus natural gas spark-ignited engine) and the magnitude of the load change, where these step loads are described as some percentage of full rated power.

The transient response and steady state stability of generator set engines can vary because of a number of factors, such as engine model, engine speed, aspiration, power factor, governor and the presence of an idle circuit. Diesel engines have a short mechanical path between the governor actuator and the fuel delivery system to the combustion chamber. This system responds quickly and in a more stable manner to load change requests from the governor. Whenever a large load is added to a generator set, engine speed temporarily slows down, or dips, before returning to its steady-state condition. When a load is removed, engine speed increases, or overshoots, temporarily. Since generator frequency is determined by engine RPM, the quality of electrical power is impacted. The measurements of these temporary speed changes is referred to as "transient response".

In the past, various patents and patent publications have been issued that relate to power usage and the control of such power usage by drilling rig systems. For example, U.S. Pat. No. 4,590,416, issued on May 20, 1986, to Porche et al., teaches a closed loop power factor control for power supply systems. This power factor controller for alternating current/direct current drilling rigs. The power factor controller utilizes a uniquely controlled, unloaded, over-excited generator to reactive power to maintain the rig's power factor within prescribed limits during peak demand operations. In particular, this method includes the step of: (1) sensing the instantaneous system power factors; (2) comparing the sensed instantaneous power factor to a prescribed power factor; (3) forming a power factor control signal indicative of the difference between the sensed power factor and the prescribed power factor; (4) providing a field excitation signal to an unloaded over-excited generator operated in the motor mode in proportion to the power factor control signal so as to cause the over-excited generator to generate the requisite reactive power to correct the system's power factor to the prescribed power factor; and (5) coupling the output of the over-excited generator to the power system.

U.S. Patent Publication No. 20088/0203734, published on Aug. 28, 2008 to Grimes et al., describes a wellbore rig generator engine power control system. This system controls power load to a rig engine. This system includes a sensor for controlling a rig engine and a sensor for sensing the exhaust temperature of a rig engine. The sensor is in communication with the controller so as so as to provide the controller with signals indicative of the exhaust temperature. The controller maintains power load to the rig engine based on the exhaust temperature.

U.S. Patent Publication No. 2009/0195074, published on Aug. 6, 2009 to Buiel, shows an energy supply and storage system for use in combination with a rig power supply system. This system includes a generator start/stop and a power output control. A bi-directional AC/DC converter converts the AC power generated by the engine-generator. The power supply is adapted to draw energy from the storage system when the rig motor exceeds the capacity of the generator.

U.S. Patent Publication No. 2009/0312885, published on Dec. 17, 2009 to Buiel, teaches a management system for drilling rig power supply and storage. This management system has a power generator coupled to rig loads. The power generator is used for powering and charging the storage system. The energy storage system draws energy from the storage system in periods of high power requirements and distributes excess energy to the storage system in periods of lower power requirements. The output of the power generator is managed based on the rig power usage wherein the output is increased when the rig power requirements are above a preselected threshold and wherein the output is decreased when the rig power requirements fall below a preselected threshold.

U.S. Patent Publication No. 2011/0074165, published on Mar. 31, 2011 to Grimes et al., describes a system for controlling power load to a rig engine of a wellbore rig. The system includes a controller for controlling the rig engine and a sensor for sensing the exhaust temperature of the rig engine. The sensor is in communication with the controller for providing to the controller signals indicative of the exhaust temperature. The controller maintains the power load to the rig engine based on the exhaust temperature.

U.S. Pat. No. 7,311,248, issued on Dec. 15, 2009 to the present inventor, provides a system for managing energy consumption in a heave-compensating drawworks. This system includes a power supply, a winch drum connected to the power supply so as to receive power from the power supply, a flywheel connected to the winch drum and to the power supply, and a controller connected to the power supply and to the winch drum for passing energy to and from the flywheel during an operation of the winch drum. The flywheel includes a disk rotatably coupled to an AC motor. This power supply includes a first pair of AC motors operatively connected on one side of the winch drum and a second pair of AC motors operatively connected on an opposite side of the winch drum.

It is an object of the present invention to provide an energy storage system for use on a drilling rig which allows a dual fuel engine/generator to operate with the same reliability and responsiveness as that of a diesel engine/generator.

It is another object of the present invention to provide an energy storage system which improves rig efficiency through energy recovery.

It is another object of the present invention to provide an energy storage system which serves to reduce the amount of wasted fuel that had previously been lost in resistive load banks.

It is another object of the present invention to provide an energy storage system which can reduce natural gas fuel consumption and reduce emissions.

It is a further object of the present invention to provide an energy storage system which allows operators to utilize wellhead gas as the fuel for the generator system.

It is still another object of the present invention to provide an energy storage system which serves as an uninterruptible power supply for use during fuel interruptions.

It is still a further object of the present invention to provide an energy storage system which reduces the vulnerability of the generator's output to variations in wellhead gas flow rates and methane contents.

It is still a further object of the present invention to provide an energy storage system which allows a dedicated or fumigation-type dual fuel engine/generator to be utilized in association with the production of power for a drilling rig.

It is still a further object of the present invention to provide an energy storage system which eliminates the requirement for auxiliary diesel engine/generator sets.

These and other objects and advantages of the present invention will become apparent from a reading of the attached specification and appended claims.

BRIEF SUMMARY OF THE INVENTION

The present invention is a system for supplying power to loads of a drilling rig which comprises a dual fuel engine/generator having an output line so as to supply AC power, an energy storage system, and a load switchably connected to one or both of the dual fuel engine/generator and the energy storage system. The dual fuel engine/generator and the energy storage system have a capacity suitable for supplying requisite power to the load. A natural gas supply is cooperative with a dual fuel engine/generator so as to supply natural gas to the dual fuel engine/generator. This natural gas supply can either be a wellhead gas or delivered gas. The dual fuel engine/generator can be a dedicated dual fuel system or a fumigation system. A supply of diesel fuel is cooperative with the dual fuel engine/generator so as to produce diesel fuel thereto.

A rectifying means is connected to an output line of the engine/generator. The rectifying means serves to convert the AC power to DC power. This rectifying means is a silicon-controlled rectifier. The silicon-controlled rectifier is phase-controlled so as to be responsive to a power requirement of the load. A phase microcontroller is connected to the load and to the dual fuel engine/generator. The phase microcontroller is cooperative with the energy storage system so as to supply power from the energy storage system to the load.

In the preferred embodiment of the present invention, the dual fuel engine/generator comprises a plurality of dual fuel engine/generators that have output lines thereof connected to a common AC bus. The load comprises a plurality of loads connected by a line to a common DC bus. The energy storage system is connected to the common DC bus. The rectifying means is connected between the common AC bus and the common DC bus so as to cause the plurality of dual fuel engine/generators to pass DC power to the common DC bus.

A plurality of autotransformers are respectively connected between the plurality of dual fuel engine/generators and the common AC bus. The load can be at least one component of the drilling rig. In the preferred embodiment of the present invention, the energy storage system is a battery or series of batteries. However, it should be noted that, within the concept of the present invention, the energy storage system can take on a wide variety of other arrangements, such as flywheels or ultracapacitors.

A switching means is provided for switching a supply of power to the load between the dual fuel engine/generator and the energy storage system based on a power output of the dual fuel engine/generator and based upon the requisite power requirement by the load. The switching means serves to monitor the power output of the dual fuel engine/generator.

The present invention is also a method for the supply power to a drilling rig. This method includes the steps of: (1) producing power from an dual fuel engine/generator so as to produce an AC power output; (2) providing an energy storage system switchably connected to the load; and (3) switching power supplied to the load between one or both of the dual fuel engine/generators and the energy storage system based upon a power requirements of the load. The AC power is rectified from the dual fuel engine/generator so as to pass DC power to the load. The rectified power is switched by a phase-controlled microcontroller. The power is switched from the dual fuel engine/generator to the energy storage system when the power output of the dual fuel engine/generator exceeds the power requirement of the load. A supply of natural gas from a wellhead can be delivered to the dual fuel engine/generator. This wellhead can be adjacent to the engine/generators. The AC power output from the dual fuel engine/generator is autotransformed and rectified so as to pass DC power to the load.

When properly designed and implemented, the energy storage system of the present invention provides the operator of gas drilling rig with reliability and responsiveness similar to that of a diesel rig. Rig efficiency is improved through energy recovery and by reducing the amount of wasted fuel previously lost in a resistive load bank. In the case where auxiliary diesel gensets are provided for standby power, the incorporation of the energy storage system eliminates this need. These benefits lead to reduced natural gas fuel consumption and reduced emissions.

Dual fuel engine/generators that are used in combination with energy storage can operate more reliably on wellhead gas so as to further reduce costs. This is achieved through the ability of energy storage to generate a load response and the UPS power ride-through for fuel interruptions. This reduces the vulnerability of generator output to variations in wellhead gas flow rate and methane content.

The dual fuel engine/generator is fueled by compressed natural gas, pipeline gas, or LNG, in combination with diesel fuel. This allows the dual fuel engine/generators to provide improved cost savings and reduced emissions compared to diesel fuel generators. Because of the bi-directional electrical power provided the energy storage system, the reliability and responsiveness of the dual fuel engine/generator meets or exceeds that of the diesel fuel generator.

The foregoing Summary of the Invention is intended to generally summarize the preferred embodiment of the present invention. This section is not intended, in any way, to be limiting of the scope of the present invention. The scope of the present invention should only be limited by the following claims and their legal equivalents.

DETAILED DESCRIPTION OF THE INVENTION

Figure 1:
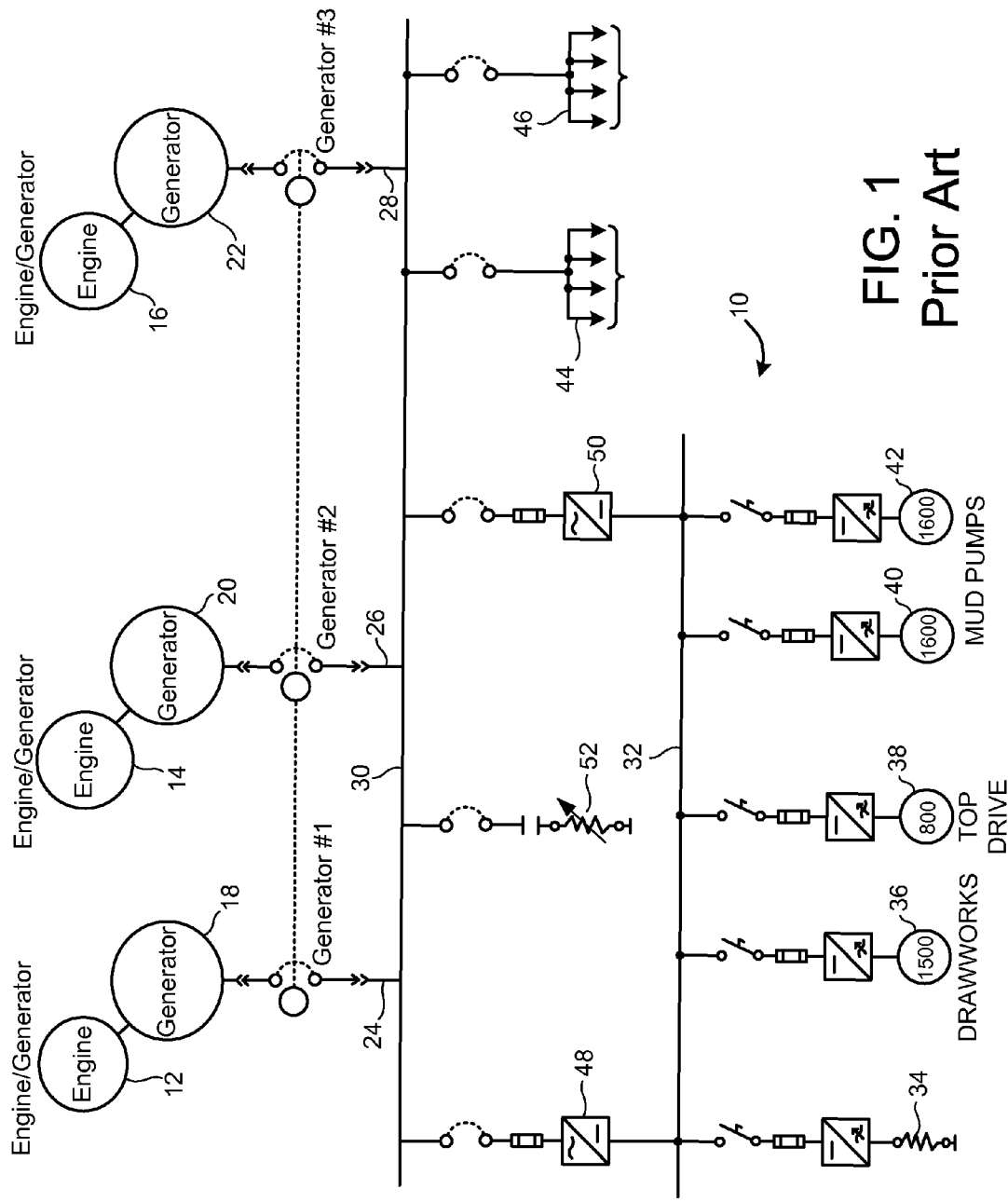
FIG. 1 is a schematic diagram of a prior art power system for the loads of a drilling rig.
Figure 2:
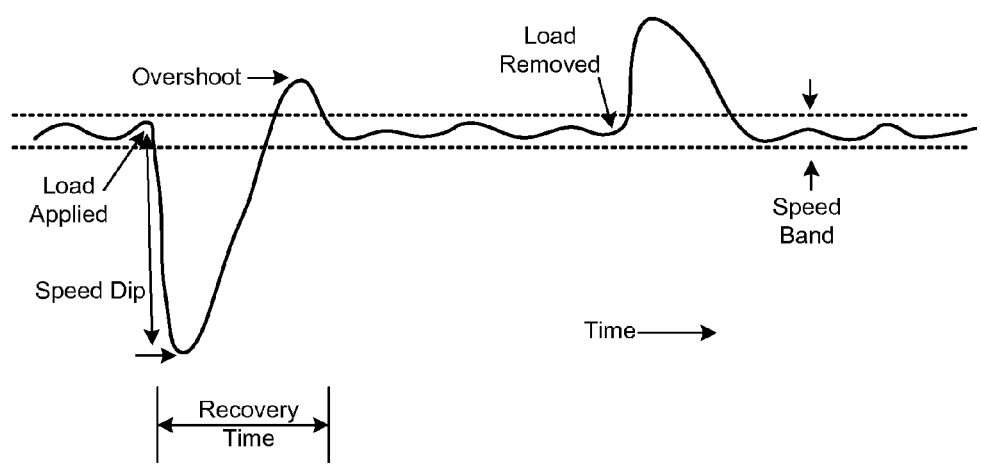
FIG. 2 is a graph showing the transient response of a natural gas engine/generator as measured by a percentage frequency change and duration.
Figure 3:
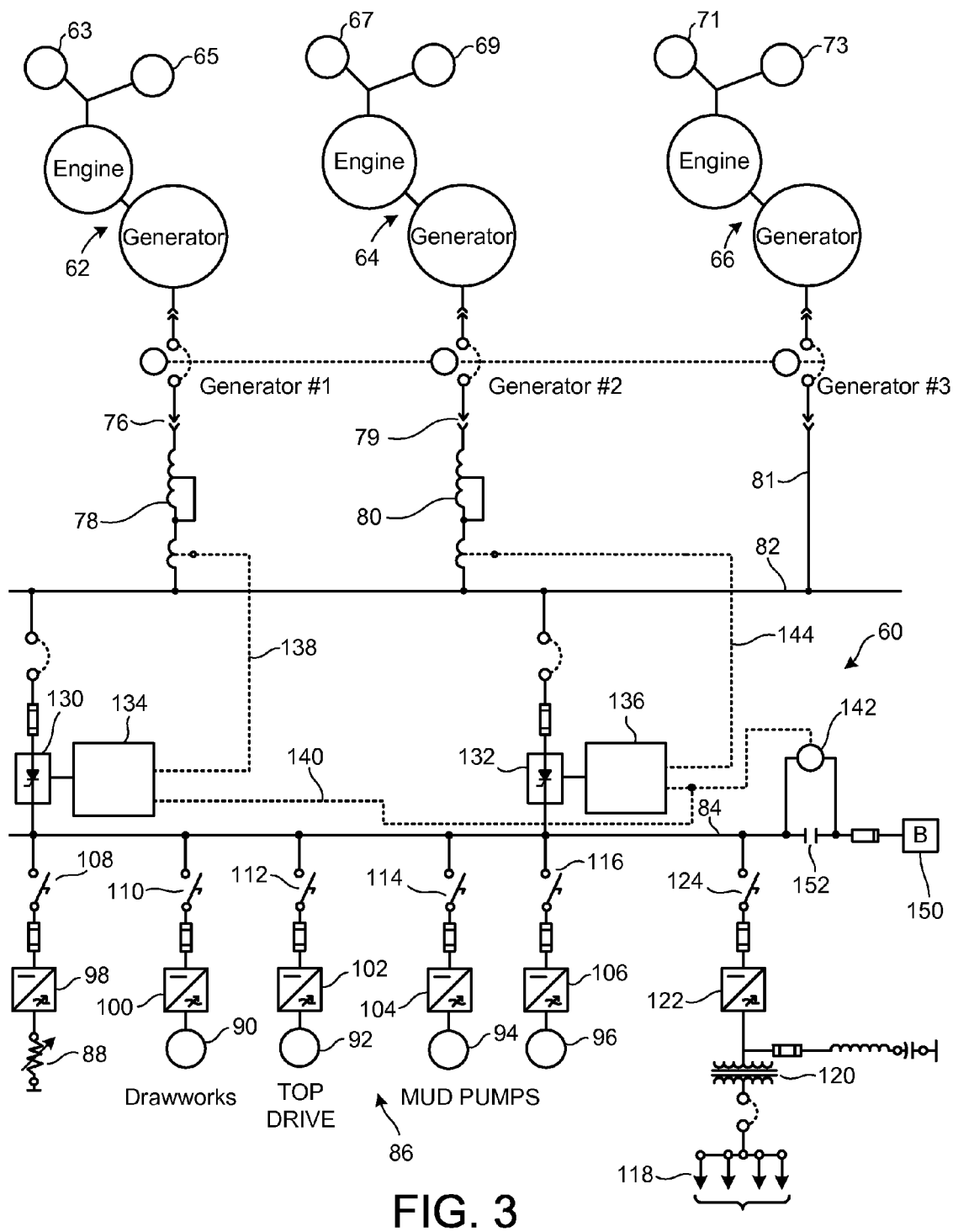
FIG. 3 is a schematic diagram showing the dual fuel power supply system for a drilling rig in accordance with the preferred embodiment of the present invention.

Referring to FIG. 3, there is shown the power supply system 60 in accordance with the preferred embodiment of the present invention. The power supply system 60 includes a first dual fuel engine/generator 62, a second dual fuel engine/generator 64, and a third dual fuel engine/generator 66. For the purposes of illustration, it can be seen that the first dual fuel engine/generator 62 is a dedicated dual fuel system which is supplied with diesel fuel supply 63 and with natural gas from a natural gas supply 65. Since the dual fuel engine/generator 62 is a dedicated system, a metering system is provided within the dual fuel engine/generator 62 so that the proper proportions of diesel fuel from the diesel fuel supply 63 and the natural gas from the natural gas supply 65 are provided directly to the engine in a fixed ratio. As such, the natural gas supply 65 should have a constant quality and methane content. The dedicated dual fuel engine/generator 62 can operate through the use of 99% natural gas and 1% diesel fuel.

The dual fuel engine/generator 64 is a fumigation-type system. A diesel fuel supply 67 and a natural gas supply 69 are connected so as to flow together to the dual fuel engine/generator 64. The natural gas supply 69 can be wellhead gas or any other supply of gas. Since the fumigation-type system is utilized for the dual fuel engine/generator 64, it is not very important to have a fixed ratio gas and diesel fuel. In fact, through the fumigation system, varying ratios of natural gas to diesel fuel can be supplied to the dual fuel engine/generator 64. Additionally, such a fumigation-type system allows the inconsistent nature of wellhead gas to be supplied directly to the dual fuel engine/generator 64. Typically, such a fumigation-type dual fuel engine/generator 64 will utilize approximately 50 and 70% natural gas and between 30 and 50% diesel fuel.

The dual fuel engine/generator 66 is connected to a supply of diesel fuel 71 and to a wellhead gas 73. The dual fuel engine/generator 66 is of the fumigation-type as described hereinbefore in association with the dual fuel engine/generator 64. As such, precise proportions of natural gas and diesel fuel are not required for the proper operation of such a fumigation-type dual fuel engine/generator 66.

The first dual fuel engine/generator set 62 is connected by a line 76 to an autotransformer 78. The autotransformer 78 is an electrical transformer with only one winding. This winding acts as both the primary and the secondary. The winding has three taps where electrical connections are made. As such, it can be utilized so as to step-up or step-down the outputs from the inputs. The primary voltage is applied across two terminals of the autotransformer while the secondary voltage is taken from these two terminals. Since the volts-per-turn is in the same winding, each develops a voltage in proportion to the number of turns. The second dual fuel engine/generator set 64 is connected along line 79 to an autotransformer 80. The third dual fuel engine/generator set 66 is connected by line 81 to the main AC bus 82. Lines 76 and 78 are also connected to the AC bus 82.

A common DC bus 84 is illustrated as connected to the various loads of the drilling rig 86. In particular, these loads can include a variable DB/load bank 88, a drawworks 90, a top drive 92 and mud pumps 94 and 96. Variable frequency drives 98, 100, 102, 104 and 106 are respectively connected to the loads 88, 90, 92, 94 and 96. The variable frequency drives 98, 100, 102, 104 and 106 are systems for controlling the rotational speed of an AC motor by controlling the frequency of electrical power supplied to the motor. DC switches 108, 110, 112, 114 and 116 are respectively interposed between the common DC bus 84 and the respective loads 88, 90, 92, 94 and 96.

The hotel system 118 can also be connected to the DC bus 84. An isolation transformer 120 is provided between the variable frequency drive 122 and the hotel system 118. A switch 124 is interposed between the variable frequency drive 122 and the DC bus 84.

Importantly, in the present invention, rectifiers are provided between the AC bus 82 and the DC bus 84. A silicon-controlled rectifier (SCR) bridge 130 is positioned between the AC bus 82 and the DC bus 84. Another SCR bridge 132 is positioned between the AC bus 82 and the DC bus 84. Each of the SCR bridges 130 and 132 are solid state semiconductors which conduct when the gate receives a trigger current and continues to conduct when they are forwardly biased. In the "off state", the SCR bridge will restrict the current to a leakage current. When the gate-to-cathode voltage exceeds a certain threshold, the SCR bridge turns on and conducts current. The SCR bridges 130 and 132 will remain in an on-state as long it remains above the holding current. Once the current falls below the holding current for a period of time, the device will switch off.

A phase microcontroller 134 is connected to the SCR bridge 130. Similarly, a phase microcontroller 136 is connected to the SCR bridge 132. As such, these microcontrollers 134 and 136 will utilize the phase angle so as to regulate the power delivered to the load by way of the SCR bridges. Each SCR bridge of the back-to-back pair is turned on for a variable portion of the half-cycle that it conducts. Power is regulated by advancing or delaying the point at which the SCR bridge is turned on within each half cycle. This phase angle control provides for fine resolution of power and is utilized to control fast-responding loads, such as loads in which the resistance change is a function of temperature. Power is regulated by advancing or delaying the point at which the SCR bridges are turned on.

It can be seen that the phase microcontroller 134 is connected by line 138 to the line 76 associated with the duel fuel engine/generator set 62. The phase microcontroller 134 is also connected by line 140 to the voltage meter 142 that is connected to the common DC bus 84. Similarly, the phase microcontroller 136 is connected by line 144 to the line 78 associated with the second duel fuel engine/generator 64 and is also connected to the voltage meter 142.

The battery bank 150 is connected to the common DC bus 84. As such, the battery bank 150 can supply power to the loads 88, 90, 92, 94 and 96. A battery bank contactor 152 is provided so as to allow the battery bank to be connected to and disconnected from the common DC bus 84.

The overall topology of the power system 60 of the present invention ties into the existing common DC bus 84. The dual fuel engine/generator sets 62, 64 and 66 are boosted in line voltage to 660 VAC via the autotransformers 76 and 78. The existing 600 volt loads are disconnected and now derived from the continuously-rated DC-to-AC fixed voltage, fixed frequency pulse-width modulation-filtered inverters. The variable frequency drives 98, 100, 102, 104 and 106 are supplied from the cumulative energy from the dual fuel engine/generator sets 62, 64 and 66 and the DC bus-connected energy storage system 150. The system control and monitoring is PLC-based with Ethernet IP network communications input/output energy storage controllers, variable frequency drives and existing rig control systems. The detailed monitoring of system activity is displayed an HMI located on the local control panel cubical door. A summary HMI monitoring screen is provided with remote viewing by the driller and original tool pusher. All activity of the energy storage system is logged, time-stamped, and permanently recorded for later analysis. Within this system topology, the variable frequency drive systems, along with all peripheral 600 volt loads, are supplied from the cumulative and power management-selected energy sources, such as the DC energy storage system and the dual fuel engine/generator sets 62, 64 and 66. By phase microcontrolling the AC-to-DC rectifiers, the power management system disconnects between amounts of energy contributed from the energy sources.

The energy storage system 150 is continually cycling between delivering power to help the dual fuel engine/generator sets 62, 64 and 66 meet rig demand and absorbing excess generator power. This function assists the dual fuel engine/generator sets with power flow during block loading and load shedding. Although the energy storage power can range by several MWs of discharge and charge power, the energy transferred is small (less than several kWhs per generator per event). Therefore, by using a small level of generator output power to make up for losses, the energy storage device 150 can be maintained close to 90% SOC. This permits almost the full capacity of the energy storage to be available when needed to support a power ride-through for interruption events.

The energy storage system 150, along with the associated components, can be enclosed within a single skid-mounted building. Automation and control is 100% redundant as to the PLC CPU, the UPS power supplies, and all critical control items necessary with energy storage and the associated control system. With proper training, the present system can be installed with a maximum downtime of less than 30 minutes.

The energy storage system 150 can be in the nature of chemical batteries, flywheels, or capacitors, or combinations of any of these devices. The energy storage system 150 must have sufficient electrical storage capacity and power rating to have adequate margins to meet the service life requirements and the power needs of the drilling rig. The energy storage system 150 is computer controlled. This controller is an electronic system which, through an array of sensors, collects data that is used to safely and reliably control charging and discharging of the energy storage system. The energy storage controller monitors health of the energy storage system through a number of parameters, such as voltage and current input/output, temperatures, state of charge, and others parameters.

The energy storage system of the present invention is designed to provide the proper amount of extra energy and power to yield the specific performance benefits for rig operation. The actual benefits of the energy storage system for dual fuel drilling rigs have been determined through a careful evaluation of actual rig data. This was data extracted from a land-based drilling rig powered by dual fuel engine generators and frequently sampled over four-month period of rig operation. The data includes both power generated and power consumed by the various rig functions.

The dual fuel engine/generator sets have evolved from mechanically-controlled workhorses to an electronically-controlled, intelligent machine. They still require careful control for reliable operation. The parameters for the dual fuel engine/generator sets, operating in an island mode, include kilowatt transducers to provide the generator's realtime, real power signal to the engine control system, sensors for monitoring the combustion conditions (oxygen level), cylinder-mounted detonation sensors, water jacket temperature sensors, air temperature sensors at inlets/outlets of the turbocharger turbines, and air manifold inlet temperatures. Each genset is controlled by this multi-parameter control and is more reliable than depending upon exhaust temperatures alone.

Energy storage reduces the criticality of governor-control of a dual fuel engine/generator. Since the energy storage system permits the generator to operate well within its permissible minimum and maximum loading conditions, loading events are better controlled and less dynamic. Therefore, the energy storage system forces operation toward steady-state conditions enabling the reliability and responsiveness of the dual fuel engine/generator to meet or exceed that of a diesel engine generator.

The energy storage system of the present invention is designed to provide the proper amount of amount of extra energy and power for the operation of the various loads. The energy storage system will assist the generator response with significantly enhanced block loading and load shedding capability with quicker recovery times. The present invention provides improved load management including reliable operation with just a single generator instead of two generators for most operations. The present invention provides better fuel economy and reduced emissions through less use of the resistive load banks and the auxiliary diesel generators. The present invention has better availability of generator power through improved step loading capability and UPS power ride-through for natural gas fuel interruptions. The energy storage system of the present invention assists the rig to operate from wellhead gas so as to further improve cost benefits. The energy storage's improvement to generator load response and UPS power ride-through for fuel interruptions reduces the vulnerability of generator output for variations and wellhead gas flow rate and methane content with the bi-directional electrical power provided by the energy storage system. The reliability and responsiveness of the dual fuel engine generator sets meets or exceeds that of diesel generators, while further providing fuel cost savings and reduced emissions. The present invention provides an anti-blackout aid with the UPS power ride-through for limited operation in the a reduced power mode and critical power mode. The generator can be operated at a somewhat higher load point so as to improved generator efficiency and extended engine life.

Figure 4:
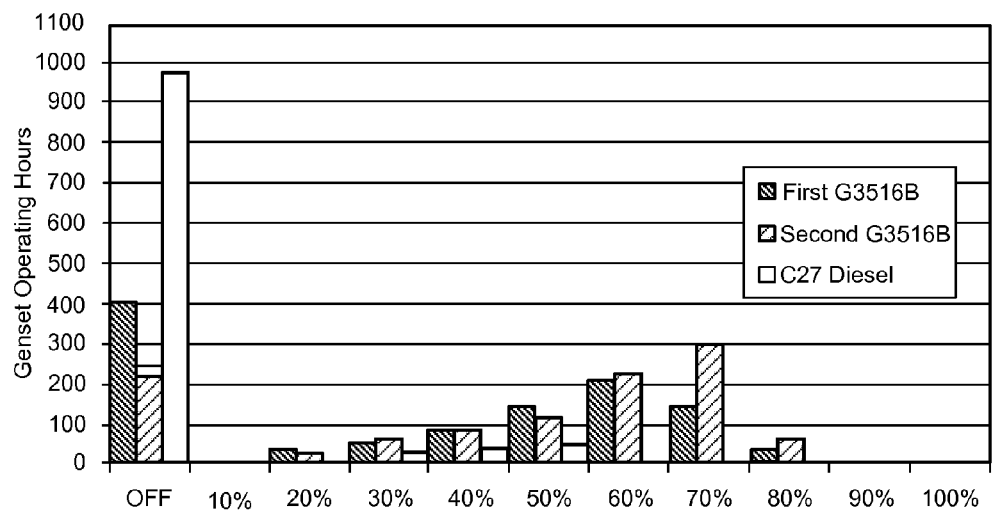
FIG. 4 is a graph showing cyclical power profiles from tripping and drilling operations.

FIG. 4 is a graph showing the operation of variable load generators without the energy storage system of the present invention. Most AC electric drilling rigs are powered by three to four diesel electric generators operating at their maximum rated speed with variable load output. FIG. 4 is an example taken from actual measured rig data with two 1350 kW generators and a 750 kW extra backup generator. The generators are operated continuously at 100% rated speed (1800 rpm). As can be seen in FIG. 4, both the time off for each generator and the time on is a function of the percent load. For this particular rig, and over the data measurement period of four months, the average rig power with 720 kW with a peak power of about 2030 MW. As can be seen in this Figure, all generators are in-use with a percent load ranging from about 10% to 80%. These generator sets are operated in this manner so as to always ensure a reserve margin of power since rig operations can involve rapid load changes. As such, it can be seen that, for proper safety, a total of three engine/generators.

Figure 5:
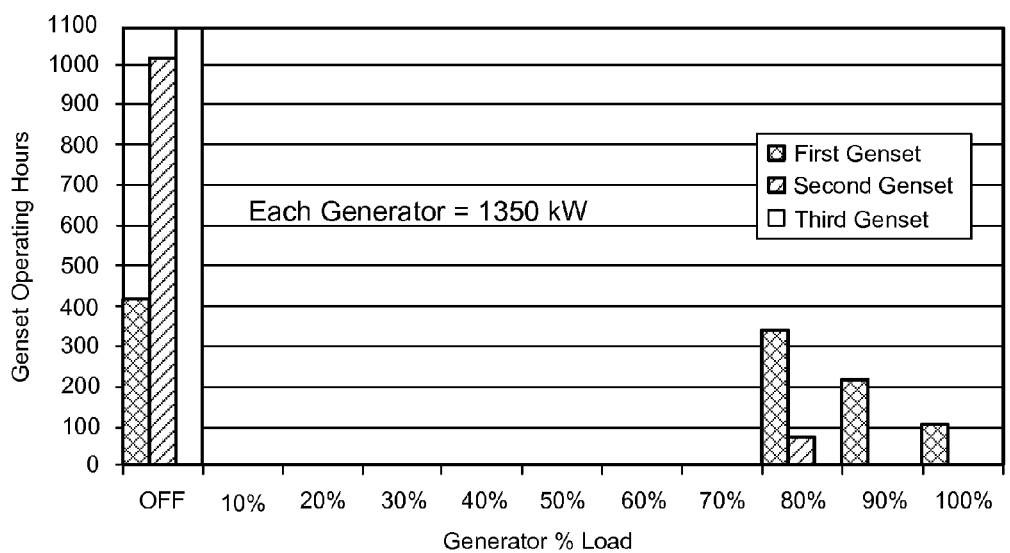
FIG. 5 shows a graph of the variable generator load at 100% speed as utilized in the energy storage system of the present invention.

FIG. 5 illustrates the benefit of energy storage as used on an existing rig. As can be seen in FIG. 5, the entire rig power demand is satisfied mostly by one 1350 kW generator with some assistance from a second 1350 kW generator. The energy storage system provides the needed extra margin to meet rig dynamic loads that reduces the number of generators. This shows that when the generators are still operating at 100% of rated speed (1800 rpm), they will not achieve the goal of extending engine life.

Figure 6:
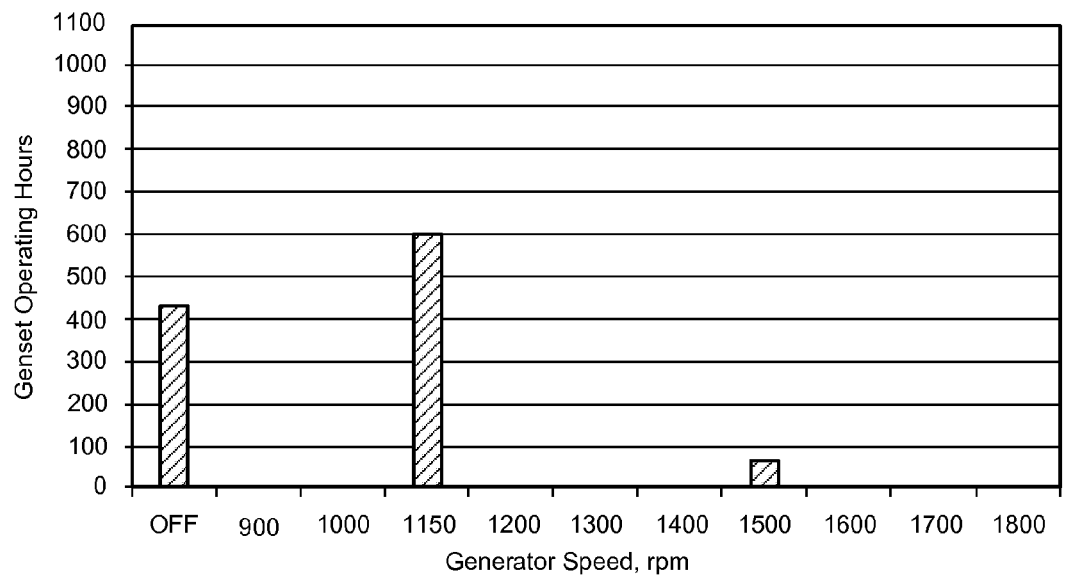
FIG. 6 shows a graph of the variable speed generator with energy storage in accordance the present invention.

FIG. 6 illustrates the operation of the present invention which serves to three 1350 kW generators with a single over-sized generator. As such, the entire rig power demand is satisfied with the single generator. The life of the engine/generator is extended by operating at lower speeds while maintaining high percent loads for operational efficiency. It also provide adequate backup power margin with the energy storage system rated with a minimum capacity of 650 kWh and 1 MW continuous and 2 MW peak power rating. The engine/generator is sized to handle the peak power of the rig at 100% speed. However, in order to extend engine life, most operation is at 60% operating speed so as to result in reduced power output. It is also important to note that this reduced power is somewhat higher than the average power demand of the rig. As such, this ensures adequate time-at-power is available to maintain the state-of charge of the energy storage system.

FIG. 6 is particularly applicable for use of 3516 C marine diesel engine. This 3516 C marine diesel engine has an intermittent rating of 2525 kW up to 1800 rpm with a continuous rating of 1100 kW at 1150 rpm. The energy storage system, through power load leveling, ensures that the generator maintains near continuous operation with minimum load interruption or cycling. Also, the power rating of the energy storage system ensures that the maximum power output of the generator at 1500 rpm is at less than 16% of the continuous hours.

Energy storage reduces the criticality of governor control of a dual fuel engine/generator. Since the energy storage system permits the generator to operate well within its permissible minimum and maximum loading conditions, loading events are better controlled and less dynamic. Therefor, the energy storage system forces operation toward steady-state conditions. This enables the dual fuel engine/generator to behave much like a diesel fuel engine/generator. Steadier load demands on the dual fuel engine/generator also enables reliable operation with a increasing fuel ratio of natural gas to diesel. This offers additional fuel savings and emissions reductions.

Figure 7:
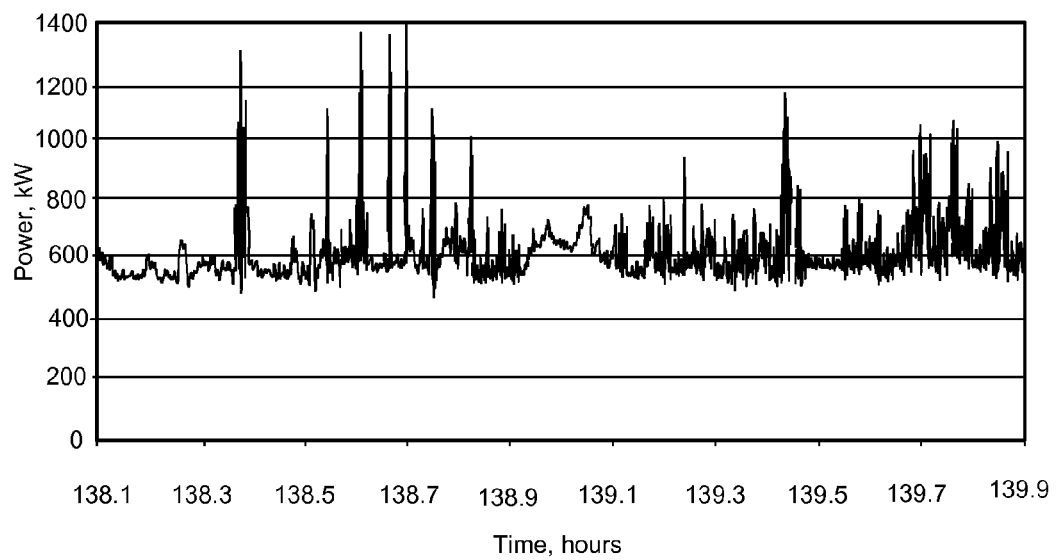
FIG. 7 is a graph showing rig power demand over time.

FIG. 7 is a graph showing the power demands of a conventional rig. The data shown in FIG. 7 was extracted from a land-base drilling rig powered by three 3512 C diesel engine/generators. FIG. 7 shows the total rig power demand for a two hour segment of the data.

In FIG. 7 (without the buffer effect of energy storage), generator controllers must force rapid power changes. The dynamic condition is less supportive of operation with a greater utilization of natural gas or wellhead gas. FIG. 7 shows that with energy storage properly sized in energy capacity and power, the rig power demand is completely satisfied with the operation of only one of the 3512 C diesel generators. The generator output has become much less dynamic and is approaching steady-state loads. This improvement offers loading conditions more suitable for a dual fuel generator, particularly one that uses a high natural gas-to-diesel fuel ratio.

Figure 8:
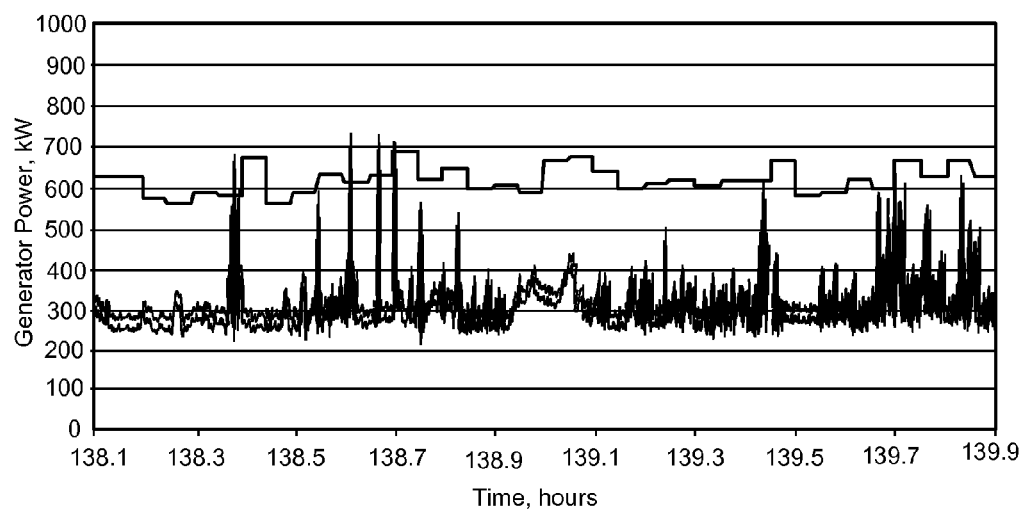
FIG. 8 is a graph showing the ability of a single dual fuel engine/generator with energy storage to accommodate the power demand over time.

In case illustrated in FIG. 8, the energy storage capacity is 1,000 kWh with continuous charge and discharge power ratings 1 MW and 2 MW, respectively. Larger energy storage devices have greater charge/discharge power ratings (kW) and can sustain greater times-at-power power (energy capacity). Therefore, the larger the energy storage device, the greater impact the energy storage device has on regulating generator output in a controlled-steady state manner. Larger energy storage devices also result is smaller depth-of-discharges which extends its service life. The minimizing of this depth-of-discharge also enables the state-of-charge to be maintained at a high value. This preserves a high level of the energy storage capacity to be available for high-power, long duration UPS power ride-through events.

Figure 9:
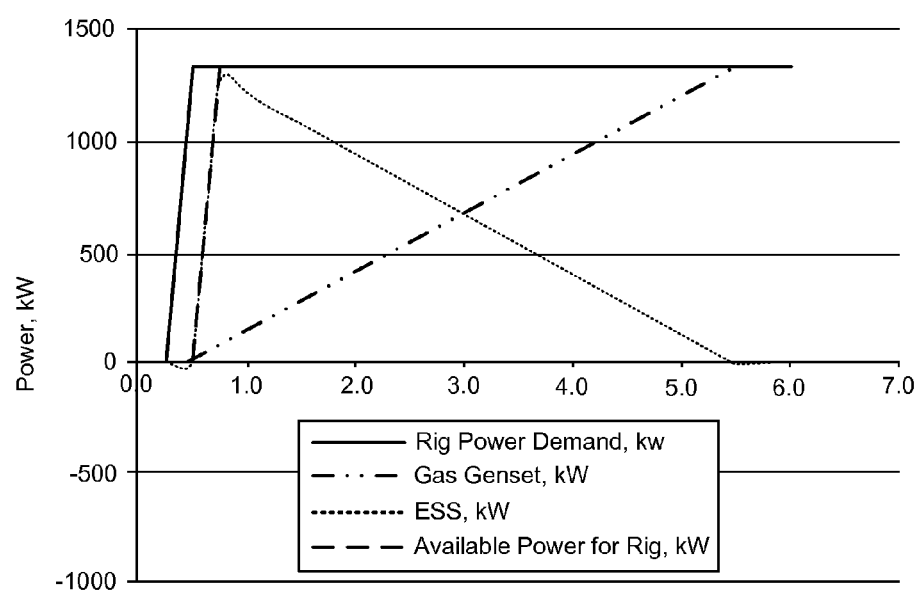
FIG. 9 is a graph of transient response for the dual fuel engine/generator with energy storage for 0% to 100% block load.

The dual fuel engine/generator of the present invention improves the transient response for better block loading and load shedding. FIG. 9 illustrates transient response for the dual fuel engine/generator with energy storage for 0% to 100% block load. The energy storage system is continually cycling between delivering power to meet rig demand and absorbing excess generator power. These functions assist dual fuel engine/generators with power flow during block loading and load shedding under high gas/fuel ratios with the utilization of wellhead gas. With energy storage, the rig demand can be met with an apparent 100% block load response from any load point, including zero. As can be seen in FIG. 9, rig power demand by 1350 kW (rated power of typical rig engine/generator) is nearly instantly supplied from the energy storage system. As the engine/generator ramps up in a controlled and reliable manner, the energy storage power is feathered back.

Figure 10:
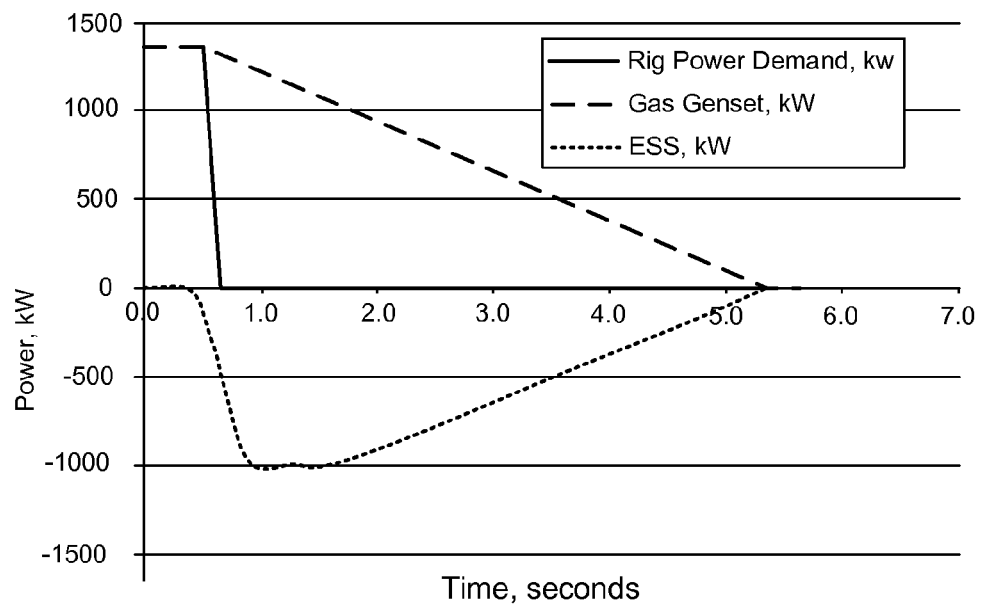
FIG. 10 is a graph showing the transient response for the dual fuel engine/generator with energy storage for 100 to 0% block load.

FIG. 10 illustrates the transient response for the dual fuel engine/generator with energy storage for 100 to 0% block load. In particular, this is the graph associated with power shedding. The present invention allows 100% load shedding to be possible. In this case, the battery system is absorbing (recovering) the excess generator output. This permits the generator to shed its load in a controlled fashion well within allowed limits for reliable operations. Examples shown in FIGS. 9 and 10 are for synchronized operation of two rig engine/generators and the energy storage system. Together, these facilitate a combined effective block load of 1.8 MW. This value is commensurate with the highest values typically observed during drilling in the actual rig data. Energy recovery during load shedding limits the battery's power input to about 1.0 MW in order to keep the battery within permissible charge rates. This is accomplished by diverting power above 1.0 MW to the dynamic brake of the rig. Any energy losses associated with this peak-shaving approach are small and insignificant.

The energy storage system of the present invention is constantly providing bi-directional power flow for improved generator operation through a DC/AC inverter regulating current flow from the battery bank to the DC bus. Power fluctuations much less than one second can take some rig components offline so as to require an extended recovery time. In the event of generator power interruptions, the energy storage system is online to provide UPS-like, power ride-through to maintain power quality. AC bus voltage will be stabilized for these short-term power interruptions and up to peak power of several MWs or more. For example, one benefit of this feature for dual fuel engine/generator operation is to always maintain electrical power to the natural gas skid to prevent fuel interruptions, if so equipped. Additionally, the energy storage's UPS power ride-through, when the rig is using wellhead gas as generator fuel, reduces the vulnerability of generator output to variations in wellhead gas flow rate and methane content.

Figure 11:
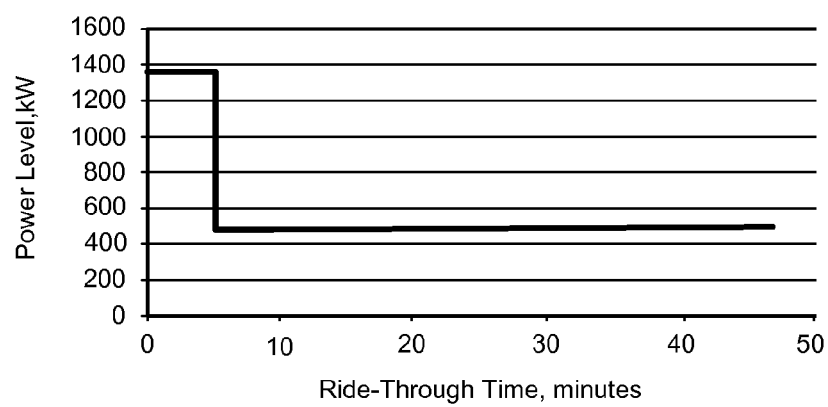
FIG. 11 is a block diagram showing ride-through power as provided by the energy storage system of the present invention.
Figure 12:
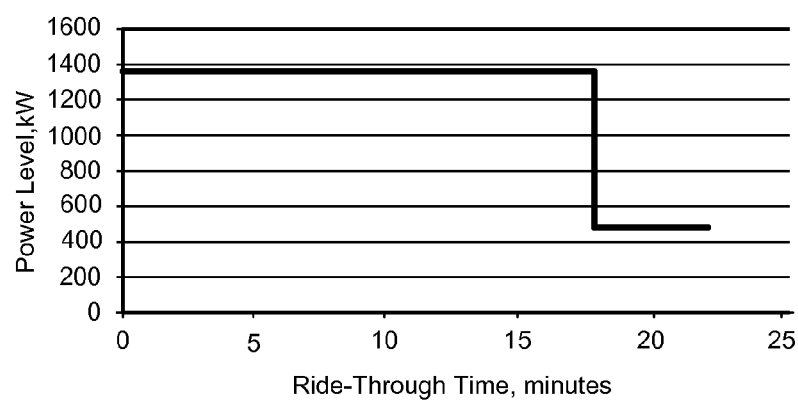
FIG. 12 is a graph showing an alternative availability of ride-through power with the energy storage system of the present invention.

For longer duration events with complete generator failure, limited operation can be sustained. This can be referred to as a "reduced power mode". The energy storage system continues to supply power to specific components, such as rig computer controls, natural gas fuel supply, mud and mixing pumps, rig hotel loads (including lighting), radiator fans, mud pump blower, air conditioning, and air compressors. If the generator failure persists, a more limited scenario, referred to as "critical power operation", provides a lower level of power to preserve critical functions to avoid rig blackout. Critical power operation may include rig computer controls, natural gas fuel supply, rig hotel loads, specific radiator fans, air conditioning, and air compressors. Power levels approach 1350 kW and 500 kW for the reduced power mode and the critical power mode, respectively. These can be supplied by the energy storage system. The battery capacity of the energy storage system is 650 kWh. Given that battery discharge will start from a state-of-charge of 90% and accounting for electrical one-way efficiencies, numerous combinations of ride-though times for each of the modes are possible. FIGS. 11 and 12 represent two possible scenarios. In FIG. 11, the rig goes into a reduced power mode for eighteen minutes so as to allow limited operation for those selected components. Subsequently, for five minutes, the critical power mode is available. In FIG. 12, the rig goes into a reduced power mode for five minutes so as to allow limited operation for those selected components. Then, for forty minutes, the rig goes into the critical power mode so as to be available to bring the generators back online and re-establish rig power.

The foregoing disclosure and description of the invention is illustrative and explanatory thereof. Various changes in the details of the illustrated construction, or in the steps of the described method, can be made within the scope of the appended claims without departing from the true spirit of the invention. The present invention should only be limited by the following claims and their legal equivalents.

I claim:

1. A system for the supply of power to a drilling rig, the system comprising:
   a dual fuel engine/generator having an output line so as to supply AC power;
   an energy storage system;
   a load switchably connected to said dual fuel engine/generator and said energy storage system, said dual fuel engine/generator and said energy storage system having a capacity suitable for supplying requisite power to said load; and
   a silicon-controlled rectifier connected to said output line of said dual fuel engine/generator, said silicon-controlled rectifier for converting the AC power to DC power, said silicon-controlled rectifier being phase-controlled so as to be responsive to a power requirement of said load.

2. The system of claim 1, further comprising:
   a natural gas supply cooperative with said dual fuel engine/generator so as to supply natural gas to said dual fuel engine/generator; and
   a diesel fuel supply cooperative with said dual fuel engine/generator so as to supply diesel fuel to said dual fuel engine/generator.

3. The system of claim 2, said natural gas supply being a wellhead gas.

4. The system of claim 2, said dual fuel engine/generator being a dedicated dual fuel engine/generator such that a fixed ratio of natural gas and diesel fuel is supplied to said dual fuel engine/generator.

5. The system of claim 2, said dual fuel engine/generator being a fumigation system such that a variable ratio of natural gas and diesel fuel is supplied to said dual fuel engine/generator.

6. The system of claim 1, further comprising:
   a phase microcontroller connected to said load and to said dual fuel engine/generator, said phase microcontroller cooperative with said energy storage system so as to supply power from said energy storage system to said load individually or in combination with said dual fuel engine/generator.

7. The system of claim 1, said energy storage system being a battery.

8. A system for the supply of power to a drilling rig, the system comprising:
   a dual fuel engine/generator having an output line so as to supply AC power;
   an energy storage system;
   a load switchably connected to said dual fuel engine/generator and said energy storage system, said dual fuel engine/generator and said energy storage system having a capacity suitable for supplying requisite power to said load, said dual fuel engine/generator comprising a plurality of dual fuel engine/generators having the output lines thereof connected to a common AC bus, said load comprising a plurality of loads connected by a line to a common DC bus, said energy storage system connected to said common DC bus;
   a rectifying means connected between said common AC bus and said common DC bus so as to cause said plurality of dual fuel engine/generators to pass DC power to said common DC bus; and a plurality of autotransformers respectively connected between said plurality of dual fuel engine/generators and said common AC bus.

9. A system for the supply of power to a drilling rig, the system comprising:
   a dual fuel engine/generator having an output line so as to supply AC power;
   an energy storage system;
   a load switchably connected to said dual fuel engine/generator and said energy storage system, said dual fuel engine/generator and said energy storage system having a capacity suitable for supplying requisite power to said load; and
   a switching means for switching a supply of power to said load between said dual fuel engine/generator and said energy storage system based on a power output of said dual fuel engine/generator and based upon the requisite power required by said load.

10. A method for the supply power to a drilling rig, the method comprising:
    operating a dual fuel engine/generator so as to produce an AC power output;
    providing an energy storage system switchably connected to a load; and
    switching power supplied to the load between said dual fuel engine/generator and said energy storage system based upon a power requirement of the load.

11. The method of claim 10, said further comprising:
    rectifying the AC power output from said dual fuel engine/generator so as to pass DC power to the load.

12. The method of claim 11, the step of switching comprising:
    switching the rectified power by a phase-controlled microcontroller.

13. The method of claim 10, further comprising:
    switching power from said dual fuel engine/generator to said energy storage system when the power output of the dual fuel engine/generator exceeds the power requirement of the load.

14. The method of claim 10, further comprising:
    supplying a fixed ratio of natural gas and diesel fuel to said dual fuel engine/generator.

15. The method of claim 10, further comprising:
    supplying a variable ratio of natural gas and diesel fuel to said dual fuel engine/generator.

* * * * *